United States Patent [19]

Ivner

[11] 4,056,768
[45] Nov. 1, 1977

[54] STATIC CONVERTOR PLANT

[75] Inventor: Sven Ivner, Vasteras, Sweden

[73] Assignee: ASEA Aktiebolag, Vasteras, Sweden

[21] Appl. No.: 650,376

[22] Filed: Jan. 19, 1976

[30] Foreign Application Priority Data

Jan. 20, 1975 Sweden .............................. 7500544

[51] Int. Cl.² .......................................... H02P 13/24
[52] U.S. Cl. .................................... 363/79; 323/102; 363/69
[58] Field of Search ...................... 321/2, 18, 27 R, 19; 323/102, 119, 127; 307/82

[56] References Cited

U.S. PATENT DOCUMENTS

| 3,746,967 | 7/1973 | Koltuniak et al. ...................... 321/19 |
| 3,932,799 | 1/1976 | Frank et al. ............................ 323/102 |
| 3,949,291 | 4/1976 | Kanngiesser et al. ................... 321/2 |
| 3,978,389 | 8/1976 | Juhlin ..................................... 321/19 |

Primary Examiner—William H. Beha, Jr.
Attorney, Agent, or Firm—Watson, Cole, Grindle & Watson

[57] ABSTRACT

In a convertor plant for connection between a DC network and an AC network which includes at least one convertor group formed of two convertors with AC terminals for connection to the AC network and DC terminals for connection to the DC network, a reactor is connected on the DC side of one of the convertors and switches are provided for alternatively connecting the DC terminals of the convertor to the DC network in parallel with the other convertor or for connecting the reactor between the DC terminals of the convertor. Preferably the plant includes two or more convertor groups, each of which is provided with a transformer for connection to the AC network, and the transformers have different circuit angles for increasing the resulting pulse number of the plant.

4 Claims, 5 Drawing Figures

STATIC CONVERTOR PLANT

BACKGROUND OF THE INVENTION

Field of the Invention

The present invention relates to a static convertor plant for connection between a DC network and an AC network and comprising at least one convertor group, each group comprising at least two convertors having AC terminals for connection to the AC network and DC terminals for connection to the DC network.

The DC voltage $U_d$ of a convertor is obtained as a function of the control angle $\alpha$, the maximum DC voltage $U_{dio}$ and the direct current $I_d$ from the relationship $$U_d = U_{dio}(\cos\alpha - d_{x1} I_d/I_{d1})$$

where $U_{dio}$ is proportional to the amplitude of the AC voltage. $d_{x1}$ is the relative DC voltage drop at rated DC, $I_{d1}$. The convertor consumes a reactive power Q from the AC network, and Q is obtained from $$Q = U_{dio} I_d \sqrt{1 - (U_d/U_{dio})^2}$$

A convertor frequently operates for the greater part of the time with a DC voltage which is considerably less than the maximum DC voltage, that is $U_d/U_{dio} << 1$, so the reactive power Q increases rapidly with the load current $I_d$. A result of this is that the comsumption of reactive power of the convertor will vary strongly with the load current, which, particularly in convertors for high power, may lead to serious drawbacks, for example strong voltage variations in the AC network.

SUMMARY OF THE INVENTION

The invention aims at providing a convertor plant, in which the variations in the consumption of reactive power in a simple and economically favorable manner are reduced to a low value.

This is accomplished according to the invention by providng at least one of the convertors in one group with a reactor on its DC side and with switching means for alternatively connecting the DC terminal of the convertor to the DC network in parallel with the other convertors or connecting the reactor between the DC terminals of the convertor. Preferably there are at least two convertor groups, each provided with a transformer for connection to the AC network, the transformers having different circuit angles for increasing the resulting pulse number of the plant. Control members are provided for influencing the switching means so that for each value of the load current of a convertor group only so many convertors within the group are connected to the DC network that the loading capacity of the convertors is not exceeded, while the reactors short-circuit the DC terminals of the other convertors.

BRIEF DESCRIPTION OF THE DRAWINGS

The invention will be further described with reference to the accompanying figures.

FIG. 1 shows a three-phase AC network 1 which is connected to a DC network 2 with the help of a convertor SR. In the example the convertor is a three-phase six-pulse thyristor bridge of a known kind. Its AC terminals are connected to the AC network 1 and its DC terminals to the DC network 2 by way of a smoothing reactor R. A current measuring device M is arranged to sense the direct current $I_d$ of the convertor. The DC voltage is designated $U_d$. A current reference value $I_r$ is supplied to a summation circuit 3, where the current error, that is the difference between $I_r$ and $I_d$ is formed. The error is supplied to the current regulator 4, which in principle consists of an amplifier with PI characteristics. The regulator emits a control signal S which in a known manner influences the control pulse device (not shown) of the convertor, and thus the control angle of the convertor and the DC voltage. Thus, the convertor has a closed circuit which endeavours to maintain $I_d$ equal to $I_r$.

FIG. 2 shows the reactive power Q consumed by the convertor as a function of the direct current $I_d$ (the maximum values of Q and $I_d$ have been designated 1) for some values of $U_d/U_{dio}$. For example, at $U_d/U_{dio} = 0.6$, Q varies from 0 (for $I_d = 0$) to 0.8 (for $I_d = 1$). The variations in Q will therefore be great, which leads to the drawbacks mentioned at the beginning.

DESCRIPTION OF THE PREFERRED EMBODIMENTS

Figure 1:
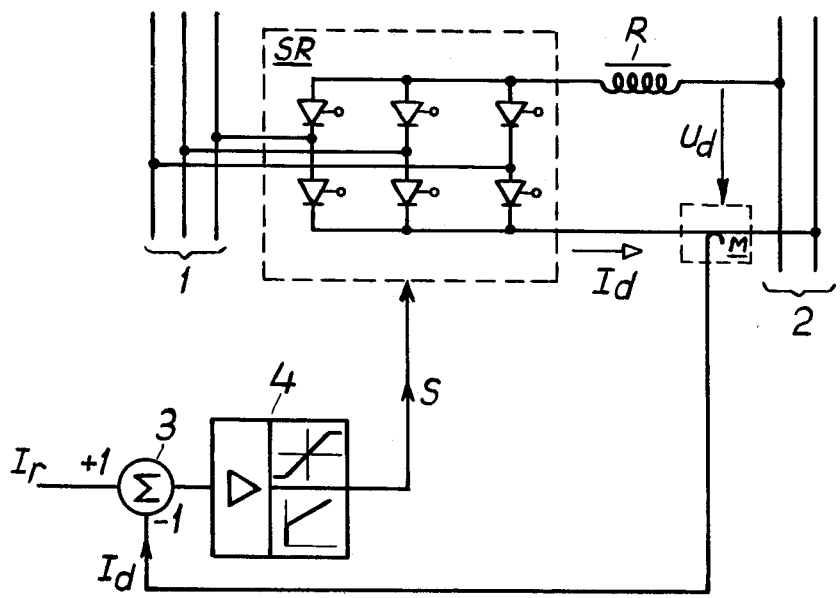
FIG. 1 shows a static convertor plant, known per se.
Figure 3:
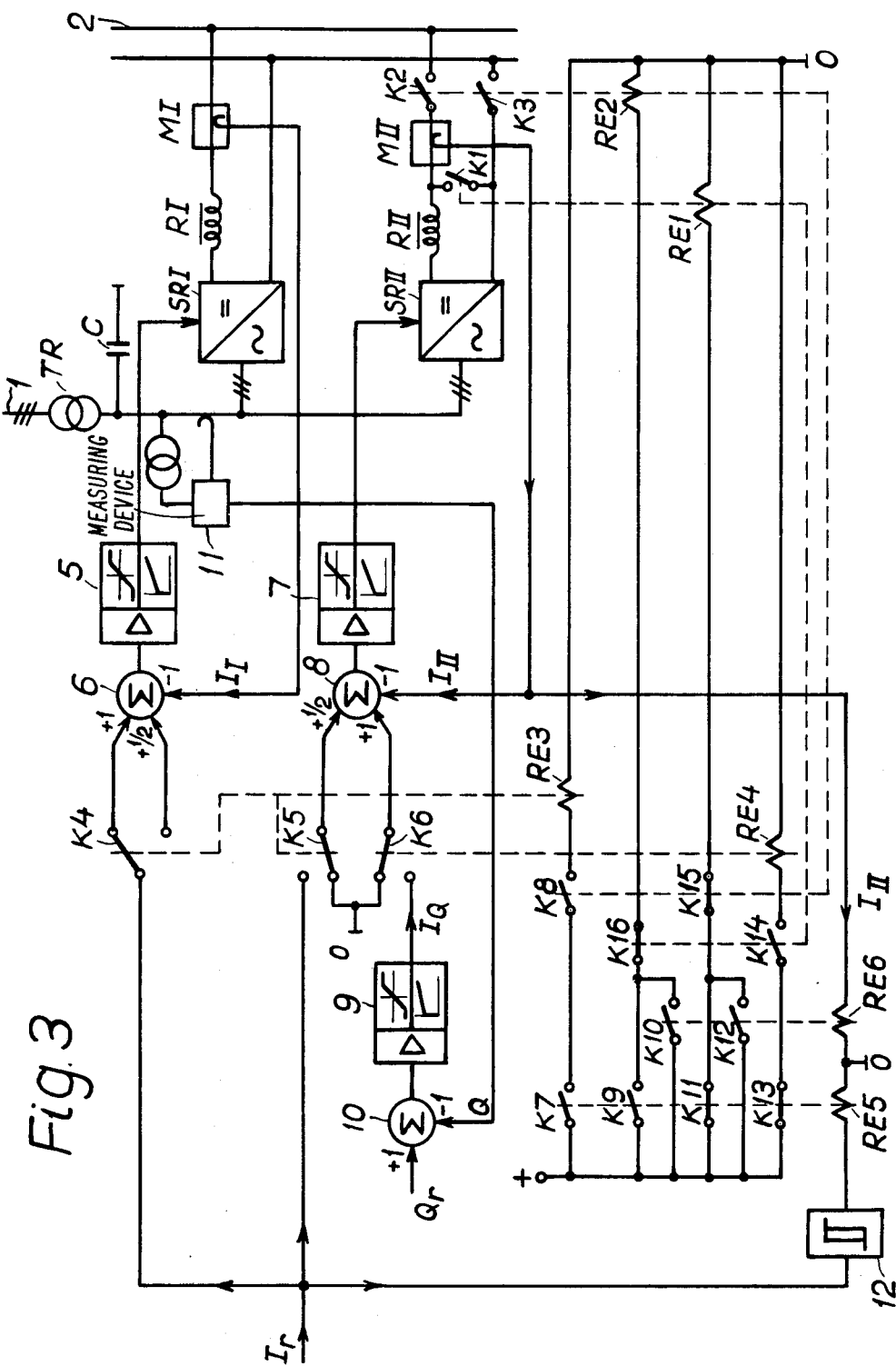
FIG. 3 shows a convertor plant according to the invention.

FIG. 3 shows a convertor plant according to the invention. It comprises two convertors, SR I and SR II, which are connected with their AC terminals to the three-phase network 1. SR I is connected with its DC terminals to the DC network 2 by way of the reactor R I. SR II is connected with its DC terminals to the net 2 by way of the reactor R II and the contacts K2 and K3 of the contactor RE2. By means of the contact K1 of the contactor RE1 the DC terminals of the converter can be shortcircuited through the reactor R II. SR I is provided with a current control circuit, similar to the one shown in FIG. 1, which consists of the current measuring device M I, the summation circuit 6 and the current regulator 5. SR II has a similar current control circuit consisting of a current measuring device M II, the summation circuit 8 and the current regulator 7. A current reference value supplied to an input marked +½ of a summation device is divided by 2 before being compared with the current value.

Furthermore, there is a circuit for control of the reactive power Q which the convertors together consume from the network 1. A measuring device 11 measures the reactive power consumption Q, which is compared with a current reference value $Q_r$ in the summation circuit 10. The difference is supplied to the power regulator 9 (which in principle may be designed in the same way as the current regulators), the output signal $I_Q$ of which can be supplied, over the contact K6 of the relay RE4, to the summation circuit 8 as the current reference value for SR II.

A current reference value $I_r$ which corresponds to the desired total direct current is supplied to the control equipment. The reference value may be obtained, in a known manner, from, for example, a potentiometer or alternatively from a controlling regulator for regulation of, for example, the voltage or power or speed of a DC motor connected to the network 2. $I_r$ is supplied to the summation circuits 6 and 8 by way of the contacts K4 and K5 of the relay RE3. $I_r$ is also supplied to a relay RE5 with the contacts K7, K9, K11, K13 by way of a circuit 12 with a certain hysteresis. The relay RE5 and the hysteresis circuit 12 are designed so that the relay is activated when $I_r = 0.5$ ($I_r = 1$ corresponds to the maximum current of the plant), and is deactivated at a value which is somewhat lower than 0.5. By the action of the hysteresis circuit unjustified relay functions are avoided when $I_r$ is almost equal to 0.5.

The current response from SR II ($I_{II}$) is further supplied to a relay RE6 with the contacts K10 and K12. Further, the contactor RE1 has the contactors K14 and K16, and the contactor RE2 the contactors K8 and K15.

The relay RE6 is arranged to be energized as soon as $I_{II}$ exceeds a low value and thus indicates in practice whether current is flowing in SR II or not.

The operation of the control system is clear from the following table:

| Time | $I_r$ | $I_{II}$ | RE1 | RE2 | RE3 | RE4 | RE5 | RE6 | SR I | SR II |
|---|---|---|---|---|---|---|---|---|---|---|
| $t_0$ | 0 | 0 | 1 | 0 | 0 | 1 | 0 | 0 | $I_r$ | $I_Q$ |
| $t_1$ | <0,5 | 0 | 1 | 0 | 0 | 1 | 0 | 0 | " | " |
| $t_2$ | <0,5 | >0 | 1 | 0 | 0 | 1 | 0 | 1 | " | 0 |
| $t_3$ | >0,5 | >0 | 1 | 0 | 0 | 0 | 1 | 1 | " | " |
| $t_4$ | >0,5 | 0 | 0 | 1 | 1 | 0 | 1 | 0 | $I_r/2$ | $I_r/2$ |
| $t_5$ | >0,5 | >0 | 0 | 1 | 1 | 0 | 1 | 1 | " | " |
| $t_6$ | <0,5 | >0 | 0 | 1 | 0 | 0 | 0 | 1 | $I_r$ | 0 |
| $t_7$ | <0,5 | 0 | 1 | 0 | 0 | 1 | 0 | 0 | " | $I_Q$ |
| $t_8$ | <0,5 | >0 | 1 | 0 | 0 | 1 | 0 | 1 | " | " |

$I_r$ is the current reference value for the total current of the plant and may vary between 0 and 1, where 1 is the maximum current. In the columns for the different relays and the contactors, "1" indicates that the relay is activated and "0" that it is de-activated. In FIG. 3 all contactors are shown in the positions they assume when the respective relay or contactor is de-activated. In columns SR I and SR II there is indicated the current reference value that the respective convertor follows.

At $t_0$ the plant is started. At $t_1$, $I_r$ is increased to a value $0 < I_r < 0.5$. At $t_2$ the current $I_{II}$ grows up. As can be seen, SR I is controlled so that its current $I_I$ is equal to $I_r$. RE1 is activated and RE2 de-activated, and SR II is thus disconnected from the network 2 and shortcircuited through R II on the DC side. SR II now works as a reactive power convertor, and its current $I_{II}$ is controlled by the reference value $I_Q$ from the regulator 9 so that the desired reactive power $Q_r$ is obtained. The plant works in this condition as long as $I_r<0.5$.

At $t_3$, $I_r$ is increased to a value $I_r < 0.5$. RE4 releases and switches in the reference value 0 to SR II, the current of which is decreased. At $t_4$ $I_{II}$ has become zero. RE1 drops and RE2 is energized and switches SR II into the network 2. SR I and SR II are now parallel-connected and are each supplied with the reference value $I_r/2$, that is the sum current will be $I_r$. At $t_5$ the current $I_{II}$ grows at the same time that the current $I_I$ drops to $I_r/2$. The convertors are now working in parallel and share the load current equally as long as $0.5 < I_r < 1$.

When the load current is reduced, the same procedure takes place in the reverse order. At $t_6$, $I_r$ is assumed to be reduced to $I_r < 0.5$. SR I then increases its current to $I_r$, and the current of SR II is reduced. At $t_7$, $I_{II}$ has become zero. RE2 drops and disconnects SR II from the network 2, and RE1 is activated and connects R II to the DC terminals of SR II. At the same time $I_Q$ is connected as the current reference value to SR II, the current of which starts increasing. At $t_8$, $I_{II}$ becomes greater than 0, and the plant is now working again with SR II as the reactive power convertor.

Figure 2:
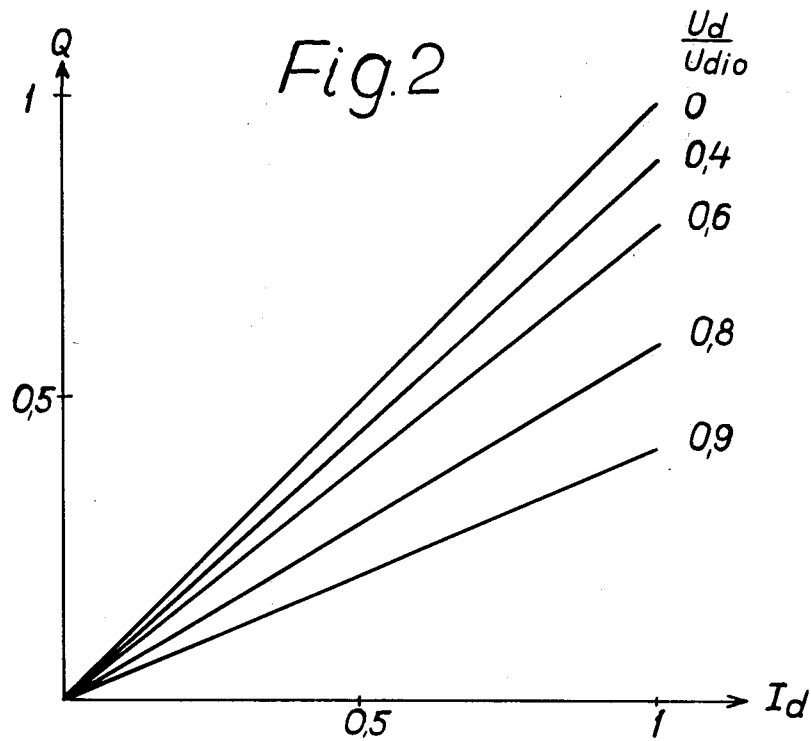
FIG. 2 shows how the reactive power consumed by the convertor in FIG. 1 varies with the load current.
Figure 4:
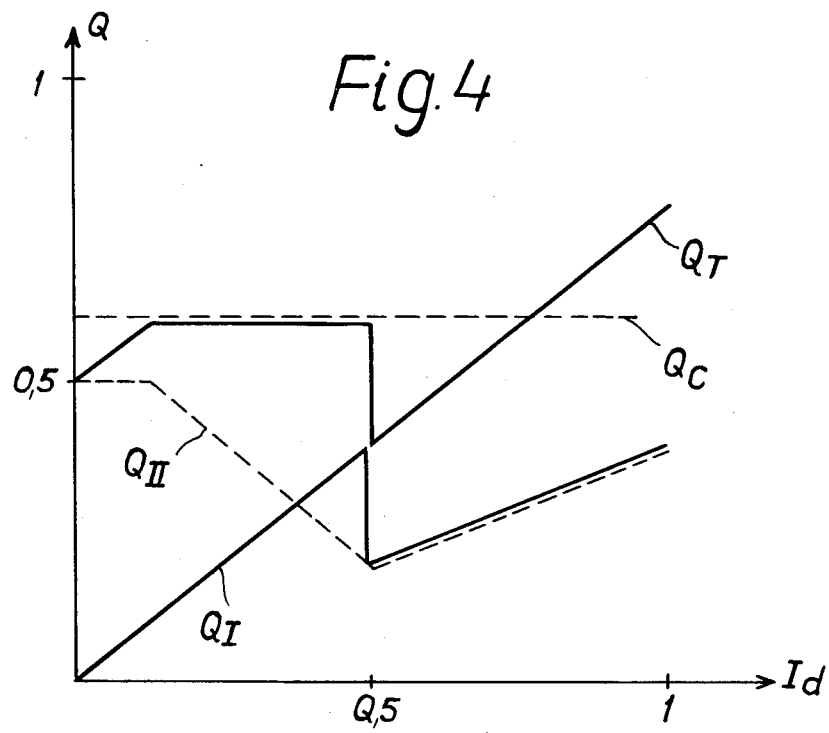
FIG. 4 shows the reactive power consumption of a plant according to FIG. 3.

FIG. 4 shows the reactive power consumption of the plant, on the one hand the total consumption $Q_T$, on the other hand the consumption $Q_I$ and $Q_{II}$, respectively, of each convertor, as a function of the total direct current $I_d$ of the plant. In FIG. 4 it has been assumed that $U_d/U_{dio} = 0.6$, and $Q_r$ is assumed to be 0.6. As will be seen, $Q_T$ varies considerably less than in the corresponding known connection according to FIG. 2.

According to one embodiment of the invention, a bank of capacitors (C in FIG. 3) can be connected to the AC voltage network 1. The bank is adjusted, for example, so that its reactive power $Q_C$ lies exactly between the greatest (0.8) and the smallest (0.4) values of $Q_T$. In the selected example in FIG. 4, $Q_C$ will then be equal to 0.6, which value has been indicated in the figure. The total consumed reactive power from the network 1, the capacitor bank being included, will then be the difference $Q_T - Q_C$. As will be seen from FIG. 4 this power deviates relatively little from zero for the major part of the range of variations of the current I, and its greatest deviation from zero is ± 0.2.

The capacitor bank C is suitably arranged on the low-voltage side of the transformer TR, which makes it possible to choose a lower rated power for the transformer than otherwise, since the reactive power is compensated on the same side as the transformer on which it is consumed.

In the case of great powers, the convertors can suitably be divided into two or more convertor groups, each group being designed, for example, according to FIG. 3 and being connected by way of a transformer each to the network 1. The transformers can then be designed with different circuit angles, which increases the resulting pulse number of the plant and provides a reduction of the disturbing influence of the plant on the networks 1 and 2.

Figure 5:
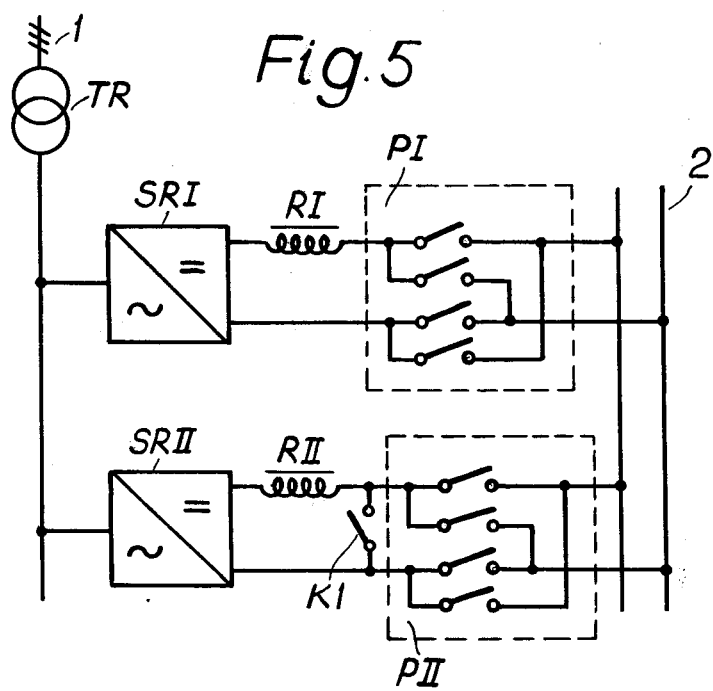
FIG. 5 shows a convertor plant with current reversers for reversing the direction of the direct current.

The plant according to FIG. 3 is only able to operate with one single direction of the direct current. If necessary, a means for reversing the pole may be arranged between each convertor and the network 2, as shown in FIG. 5 (current reversers P I and P II)

If a rapid operation is desirable, the contacts in the main circuit may be replaced by controllable semiconductor elements (thyristors) and the relay operations be replaced by electronic relays.

The above describes a plant in which each convertor group (a plant with one group is shown in FIG. 3) comprises two convertors (SR I and SR II in FIG. 3). Of course, each convertor group may comprise more than two convertors. In the general case a group may comprise N equally large convertors (in FIG. 3, N = 2), each of which is thus designed for a maximum current of $I_{max}/N$, where $I_{max}$ is the total maximum current of the plant. An arbitrary number of these convertors are arranged, as SR II in FIG. 3, to be able to operate as reactive power convertors, whereas the other convertors do not need to have this function. The convertors are preferably controlled so that there are never more convertors connected to the DC network than what is required to be able to handle the total load current $I_d$ prevailing on that occasion, whereas the rest of the convertors are working as reactive power convertors and are controlled so that the reactive power consumption of the plant is as constant as possible.

It is not necessary, of course, that the convertors within one group are designed for exactly the same maximum current.

FIG. 3 shows the DC sides of the convertors connected to a DC network 2. This may consist alternatively of one or more discrete objects, for example one or more DC motors or an accumulator battery. The network 2 may also constitute the intermediate stage in a frequency convertor with direct current or direct voltage intermediate stages.

In plants for high current a plant according to the invention is particularly favourable. In such a plant a parallel-connection must be made, because of the limited loading capacity of the semiconductor element, and this is usually done by connecting the required number of convertors in parallel. The additional cost of arranging these convertors to work according to the invention will then be low in comparison with the advantages which are to be derived therefrom.

I claim:

1. Convertor plant for connection between a DC network and an AC network and comprising at least one convertor group, each said convertor group comprising at least two convertors with AC terminals for connection to the AC network and with DC terminals for connection to the DC network, at least one of said convertors in said at least one connector group including a reactor connected on its DC side and with switching means for alternatively connecting the DC terminals of said at least one convertor to the DC network in parallel with the other convertors or connecting said reactor between the DC terminals of said at least one convertor, control means for controlling said switching means in dependence on the load current of said convertors.

2. Convertor plant according to claim 1, in which said control means include additional means for controlling said switching means so that at each value of the load current of said at least one convertor group only so many convertors within the group are connected to the DC network that the loading capacity of the convertors is not exceeded, and further comprising reactors for short-circuiting the DC terminals of the other convertors.

3. Convertor plant according to claim 1, in which said control means includes means to control the current of the convertors connected to the DC network in accordance with a first reference current and the current of the other convertors in accordance with a second reference current.

4. Convertor plant according to claim 1 further comprising means for controlling the total current of the convertors connected to the DC network in accordance with a reference current, said control means controlling said switching means in dependence on said reference current.

* * * * *